United States Patent

Haass

(10) Patent No.: US 6,443,346 B1
(45) Date of Patent: Sep. 3, 2002

(54) GUN RACK FOR NONDESTRUCTIVE USE IN VEHICLE

(76) Inventor: Troy Haass, 403 CR 453, Hondo, TX (US) 78861

(*) Notice: Subject to any disclaimer, the term of this patent is extended or adjusted under 35 U.S.C. 154(b) by 0 days.

(21) Appl. No.: 09/370,122

(22) Filed: Aug. 6, 1999

(51) Int. Cl.$^7$ .............................................. B60R 11/00
(52) U.S. Cl. ...................... 224/539; 224/275; 224/549; 224/550; 224/558; 224/571; 224/913; 211/64
(58) Field of Search ................. 224/275, 558, 224/549, 913, 539, 545, 548, 550, 553, 571; 211/64, 195; 248/578, 584, 647, 653, 615; 42/94

(56) References Cited

U.S. PATENT DOCUMENTS

| | | | | |
|---|---|---|---|---|
| 1,590,910 A | * | 6/1926 | Rumrill | 248/80 |
| 1,906,380 A | * | 5/1933 | Johnson | 248/80 |
| 2,698,725 A | * | 1/1955 | Triplett | 248/511 |
| 2,721,680 A | * | 10/1955 | Steckman | 224/275 |
| 2,750,088 A | | 6/1956 | Agostini et al. | 224/1 |
| 2,775,351 A | | 12/1956 | Johnson et al. | 211/64 |
| 3,473,673 A | | 10/1969 | Porter | 211/64 |
| 3,477,586 A | | 11/1969 | Haluska | 211/64 |
| 3,497,077 A | | 2/1970 | Sjostrand | 211/64 |
| 3,693,808 A | * | 9/1972 | Rauch | 211/181 |
| 3,706,403 A | | 12/1972 | Sikes | 224/1 |
| 3,767,094 A | | 10/1973 | Sikes | 224/1 |
| 3,806,265 A | * | 4/1974 | Hattan | 403/46 |
| 4,057,183 A | * | 11/1977 | Ness | 224/42.45 |
| 4,131,202 A | | 12/1978 | Hansen | 211/2 |
| 4,364,499 A | | 12/1982 | McCue | 224/42.45 |
| 4,560,134 A | | 12/1985 | Klein | 248/511 |
| 4,579,263 A | | 4/1986 | Ehmke et al. | 224/42.42 |
| 4,594,805 A | * | 6/1986 | McClelland | 43/21.2 |
| 4,852,780 A | | 8/1989 | Woodbury | 224/42.45 |
| 4,936,531 A | | 6/1990 | Bauser | 224/42.11 |
| 5,443,191 A | | 8/1995 | Jorgenson | 224/543 |
| 5,495,969 A | | 3/1996 | Cardenas | 224/275 |
| 5,682,700 A | * | 11/1997 | Sandberg | 42/94 |
| 5,799,850 A | | 9/1998 | Ryder | 224/539 |
| 5,833,102 A | | 11/1998 | Jacobson | 224/275 |
| 5,845,427 A | * | 12/1998 | Taylor | 42/94 |

* cited by examiner

Primary Examiner—Gregory M. Vidovich
(74) Attorney, Agent, or Firm—Wayne J. Colton, Inc.

(57) ABSTRACT

A gun rack for nondestructive use in any of a variety of vehicle models generally comprises two substantially L-shaped vehicle engagement members and a cross bar disposed therebetween. The cross bar comprises at least one trough adapted to support the stock portion of a gun. The L-shaped members are adapted to flexibly engage opposite side portions of a vehicle center console. Padding is provided for protection of the vehicle and supported gun. The cross member may be adjustable in length to facilitate use with a wider variety of console styles. In this case, adjustment of the length of the cross member effects the relative spacing between the two L-shaped members. The adjustable cross member may comprise a turnbuckle, which may have a locking device adapted to selectively fix the length of the cross member and, thus, the width of the gun rack. A barrel stabilizer generally comprising a flexible base member having a cup disposed thereon is provided for additional security of the gun and protection of the vehicle's carpet. The stabilizer comprises a flexible polymeric material for stable frictional engagement with the vehicle's floorboard. The bottom portion of the stabilizer may be provided with hook-type fasteners for engagement with the vehicle's carpet. Each L-shaped engagement member may be adapted to fold about hinges for storage. The hinges may be provided with locking devices, enabling use of the gun rack on a bench seat rather than about a console.

20 Claims, 3 Drawing Sheets

GUN RACK FOR NONDESTRUCTIVE USE IN VEHICLE

FIELD OF THE INVENTION

The present invention relates to gun racks. More particularly, the invention relates to a gun rack specifically adapted for repeated secure placement in, and total removal from, a vehicle without incurring damage to the vehicle during placement, use or removal.

BACKGROUND OF THE INVENTION

Gun racks have been used in automobiles for nearly as long as automobiles have been on the roads. Through the years, however, many improvements have been made to the early gun racks to increase both the safety and security provided. For example, as shown in U.S. Pat. No. 4,364,499 issued Dec. 21, 1982 to McCue, many automobile gun racks are provided with lock and key type latching mechanisms. Likewise, much effort has been made to prevent damage to the gun being transported. As shown in U.S. Pat. No. 3,497,077 issued Feb. 24, 1970 to Sjostrand, one such improvement comprises surfacing the gun rack with a resilient coating. Unfortunately, though, little real progress has been made toward the development of an automobile gun rack that provides safety, security and protection against gun damage as well as protection against devaluation of the user's vehicle.

Most of the known automobile gun racks require modification of the vehicle in order to provide a safe and secure means for supporting a gun. For example, McCue teaches the use of bolts to secure a gun rack to the floorboard of the host vehicle. Similarly, U.S. Pat. No. 4,560,134 issued Dec. 24, 1985 to Klein teaches the use of fasteners for mounting a gun rack to the floor or tunnel sheet metal of an automobile passenger compartment; U.S. Pat. No. 4,579,263 issued Apr. 1, 1986 to Ehmke et al. teaches the use of bolts to secure a gun rack to the floor of a vehicle; and U.S. Pat. No. 5,799,850 issued Sep. 1, 1998 to Ryder teaches the use of screws to mount a gun rack to a vehicle floor. In addition to the inherent damage to the vehicle, an additional consequence of these long established and now very standard mounting techniques is that the available gun racks tend to very narrowly adapted for installation in a particular place on a particular vehicle type.

With these shortcomings of the prior art clearly in mind, it is the primary object of the present invention to improve over the prior art in providing a gun rack adapted for use in a vehicle with no resultant damage to the vehicle, but without sacrifice of the many safety and security features presently known. It is a further object of the present invention to provide such a gun rack that is also readily adaptable for use in a number of configurations in a wide variety of vehicle types. Finally, it is an object of the present invention to provide such a gun rack that is inexpensive and relatively simple to manufacture and, thus, may be enjoyed by most automobile owning gun enthusiasts.

SUMMARY OF THE INVENTION

In accordance with the foregoing objects, the present invention—a gun rack for nondestructive use in any of a variety of vehicle models—generally comprises two substantially L-shaped vehicle engagement members, each having a leg portion and a foot portion, and a cross bar disposed between the upper end of the leg portions. The cross bar, or member, is dependently supported by the leg portions and comprises at least one trough adapted to support the stock portion of a gun.

Each leg portion or, preferably, each entire L-shaped member is provided with a depressible outer surface adapted to firmly engage a vehicle console without damage. Such a surface may comprise a foam, soft plastic or other substantial equivalent. Similarly, each trough, generally comprising a substantially concave upper portion and a substantially convex lower portion, is provided with a like depressible surface for protection of the gun's stock.

In at least one embodiment of the present invention, each leg portion of the L-shaped members is adapted to flexibly engage an opposite side portion of a vehicle center console. In this embodiment, the members may comprise a spring steel construction. In another embodiment, however, which may include some or all of the features of the first embodiment, the cross member is adjustable in length to facilitate use with a wider variety of console styles. According to this embodiment, adjustment of the length of the cross member effects the relative spacing of the two leg portions. In one implementation, the adjustable cross member comprises a turnbuckle, which may have a locking device adapted to selectively fix the length of the cross member and, thus, the width of the gun rack.

A barrel stabilizer generally comprising a flexible base member having a cup disposed thereon is preferably provided for additional security of the gun as well as protection of the vehicle's carpet. In the preferred embodiment, the stabilizer comprises a flexible polymeric material for stable frictional engagement with the vehicle's floorboard. In addition, the bottom portion of the stabilizer may be provided with hook-type fasteners for releasable engagement with the vehicle's carpet.

In an alternate embodiment, each L-shaped engagement member is adapted to fold upon itself such that each foot portion may be positioned substantially parallel to its corresponding leg portion. In at least one implementation of this feature, a pair of hinges is disposed one each between the leg portion and the foot portion of each member. Additionally, a second pair of hinges may be interposed one each in a knee region of the leg portion of each engagement member. This second pair, which defines an upper leg portion and a lower leg portion in each leg portion, enables articulation of the cross bar and upper leg portions with respect to each corresponding lower leg portion. In order to secure this embodiment into a desired fixed configuration, each hinge preferably comprises a position-locking device.

Finally, many other features, objects and advantages of the present invention will be apparent to those of ordinary skill in the relevant arts, especially in light of the foregoing discussions and the following drawings, exemplary detailed description and appended claims.

BRIEF DESCRIPTION OF THE DRAWINGS

Although the scope of the present invention is much broader than any particular embodiment, a detailed description of the preferred embodiment follows together with illustrative figures, wherein like reference numerals refer to like components, and wherein.

DETAILED DESCRIPTION OF THE PREFERRED EMBODIMENT

Although those of ordinary skill in the art will readily recognize many alternative embodiments, especially in light of the illustrations provided herein, this detailed description is exemplary of the preferred embodiment of the present invention, the scope of which is limited only by the claims appended hereto.

Figure 1:
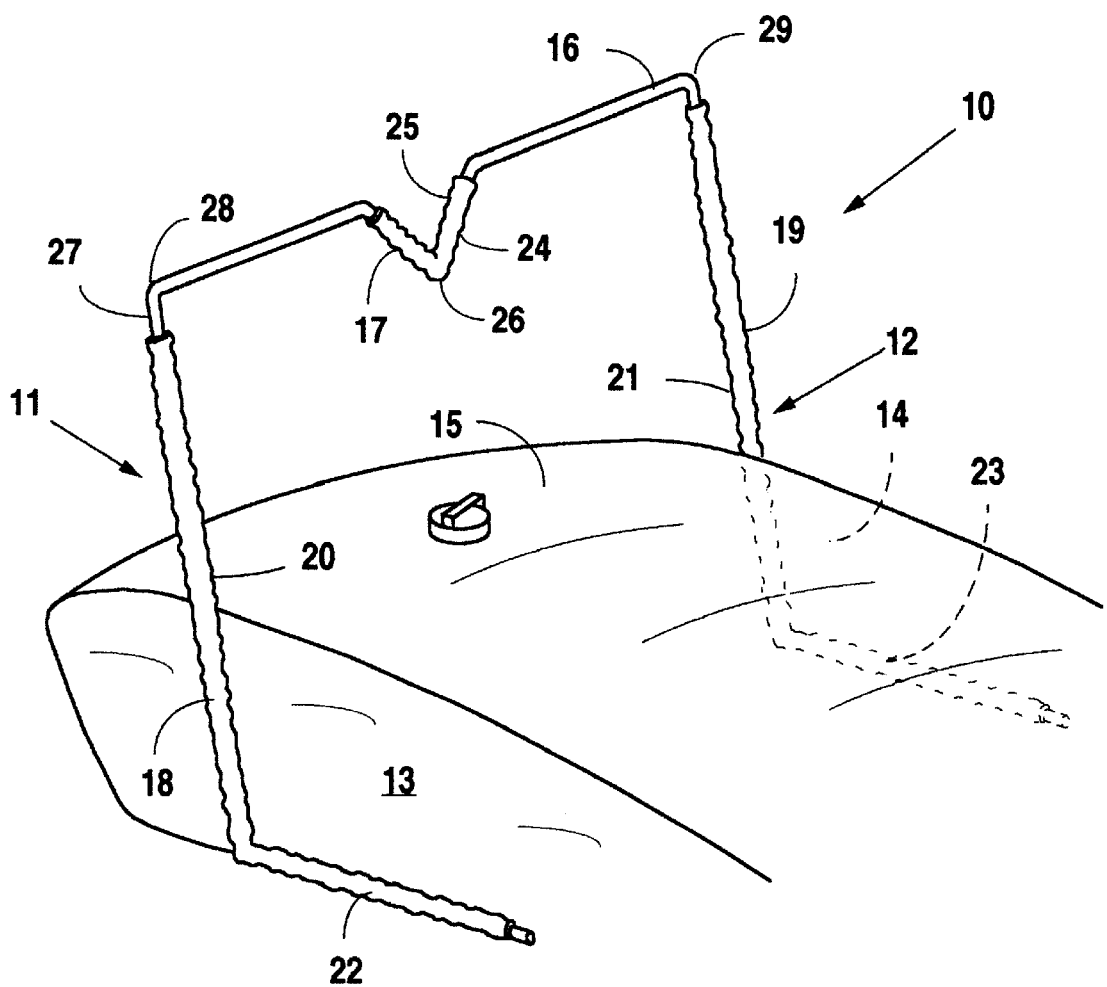
FIG. 1 shows, in perspective view, the first preferred embodiment of the gun rack of the present invention.

Referring now to FIG. 1 in particular, the present invention is shown to generally comprise a pair of L-shaped frame members 11, 12, adapted to engage the sides 13, 14 of a vehicle's center console 15, and a cross bar 16, between the L-shaped members 11, 12, having therein a trough 17 for supporting the stock portion of a rifle or shotgun. In the preferred embodiment of the present invention, each L-shaped member 11, 12 is provided with padding 18, 19, such as a foam material or soft plastic coating, which is at least slightly depressible in order to prevent damage to the console 15. Although those of ordinary skill in the art will recognize that this padding 18, 19 is most critical on the leg portions 20, 21 of the members 11, 12, it is preferred that the foot portions 22, 23 as well be provided with the padding 18, 19 to prevent damage to the console 15 or adjacent seats during placement or removal, as detailed further herein, of the gun rack 10.

As also shown in FIG. 1, the cross bar 16 extending between the L-shaped members 11, 12 is provided with at least one trough 17 for receiving therein the stock of the supported gun. As with the frame members 11, 12, this trough 17 is preferably provided with padding 24 to prevent damage to the gun's stock during use. Although those of ordinary skill in the art will recognize many substantial equivalents, this padding 24 preferably comprises a foam or soft plastic layer, applied to at least the upper concave portion 25 of the trough 17. It is preferred, however, that the entire trough 17, including its lower convex portion 26 be padded in order to ensure absolutely no damage to the stock. Finally, the cross bar 16 is preferably provided with a strap, or other substantially equivalent means, for securing the gun firmly in the trough 17 during use. Such a strap not only adds safety to the transport of the gun but also serves to prevent jostling of the gun, which might otherwise cause marring on the stock. According to the preferred embodiment of the present invention, the strap comprises a pair of soft fabric strips provided with releasably engageable hook and loop type fasteners such as are commercially available under the well known trademark "VELCRO."

In at least the first preferred embodiment of the present invention, each L-shaped member 11, 12 comprises a spring steel 27 interior construction. In this manner, the members 11, 12 are adapted to bend at their interfaces 28, 29 with the cross bar 16 and thereby be flexed away from one another. The spring steel construction, however, tends to return the members 11, 12 firmly to their original positions in substantially parallel planes in the absence of an expanding force. Additionally, the gun rack 10 is sized such that the parallel planes containing the members 11, 12 are slightly closer together than is wide a typical vehicle center console 15. As a result, the members 11, 12 are adapted to be slightly spread apart and then slidingly engaged about the center console 15, whereafter the spring steel construction serves to securely hold the gun rack 10 in position. Because the engaging members 11, 12 are padded, the gun rack 10 may be placed and removed, as desired, without damage to the vehicle.

Figure 2:
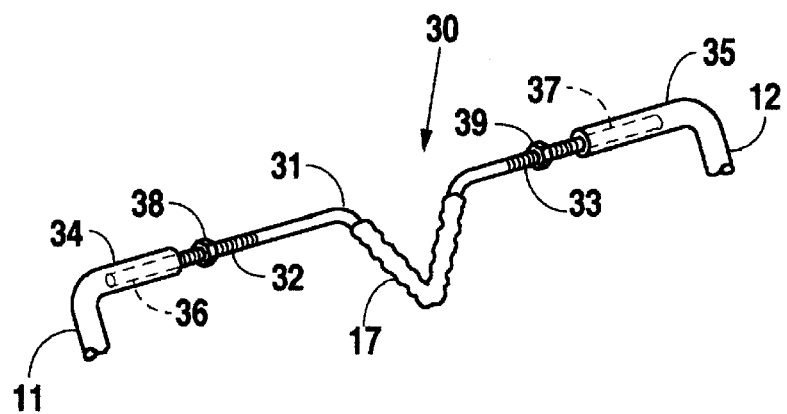
FIG. 2 shows, in perspective view, a detail of the second preferred embodiment of the gun rack of the present invention.

In a second preferred embodiment of the present invention, a detail of which is depicted in FIG. 2, the cross bar member 16 is made to be adjustable in length. In this manner, the gun rack 10, of the present invention is adapted for use with consoles 15 having a greater range of standard widths. In particular, the preferred embodiment of the present invention comprises an integral turnbuckle 30 as part of the cross bar 16. As shown, the central portion 31 of the cross bar 16, which includes the one or more troughs 17, comprises oppositely threaded end portions 32, 33. The outer portions 34, 35 of the cross bar 16, which in this embodiment are integral with the upper leg portions 20, 21 of the L-shaped members 11, 12, each comprise a female-threaded axial aperture 36, 37 for receiving one each therein the ends 32, 33 of the central portion 31.

As will be understood by those of ordinary skill in the art, rotation of the central portion 31 in one direction will serve to close the outer portions 34, 35 toward one another while rotation in the opposite direction will serve to repel the outer portions 34, 35 away from one another. As also will be understood by those of ordinary skill in the art, these actions may be used to adjust the distance separating the L-shaped members 11, 12, thereby causing the members 11, 12 to firmly engage a particular center console 15. It should be understood, however, that this feature, which may be implemented in any substantially equivalent manner, may be used independently or in combination with the spring feature as previously described. Also, locking nuts 38, 39 may be provided on one or both threaded ends 32, 33 of the central portion 31 of the cross bar 16 to prevent inadvertent rotation of the trough 17, thereby securing the gun rack's width as desired by the user.

Figure 3:
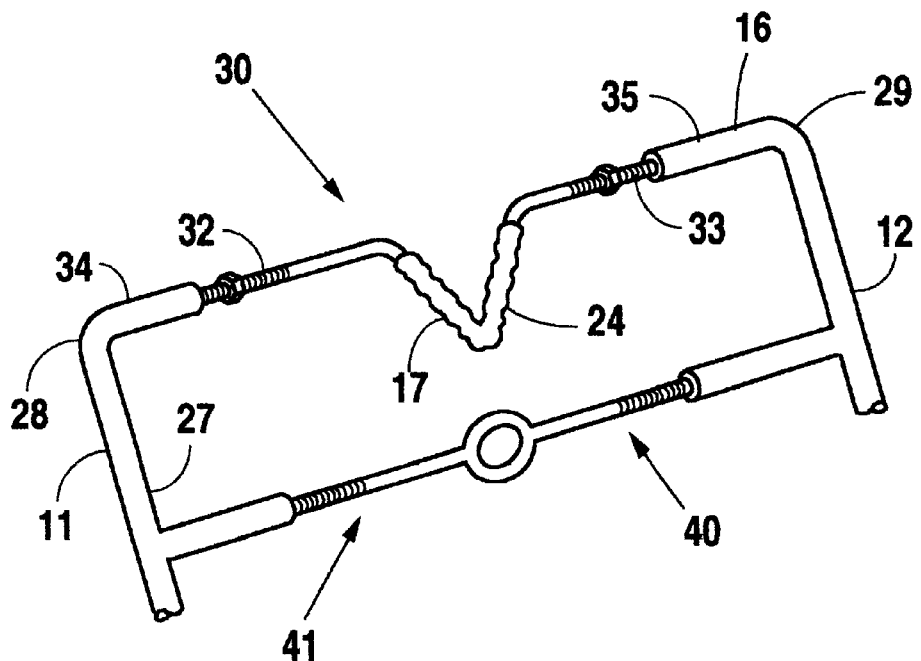
FIG. 3 shows, in perspective view, an extension of the detail of FIG. 2.

In an extension of the second preferred embodiment, shown in FIG. 3, the gun rack 10 may be provided with a second cross member 40 between its legs 20, 21 a distance separate from the first, stock supporting cross bar 16. As shown in the Figure, the second member 40 may also comprise a length adjustment feature, such as a turnbuckle 41. As will be understood by those of ordinary skill in the art, adjustment of the length of one cross member 16, 40 relative to the other 40, 16 creates a lever action in the L-shaped engagement members 11, 12 about the fulcrum of the second cross bar 40. In this manner, a very tight engagement of the console's sides 13, 14 may be effected over a wide range of console widths. In addition, the connection of the two L-shaped members 11, 12 with a turnbuckle 16, 40 allows the their separation one from another, giving rise to a compactly storable gun rack 10.

Those of ordinary skill in the art will also recognize that this extension may be implemented with only one of the two cross bars 16, 40 being adjustable in length. In this case, it is preferred that the fixed length cross bar be flexibly hinged, journalled or equivalently connected to the leg portion 20, 21 of the engagement members 11, 12 in order to provide a fulcrum. It should be appreciated, however, that the necessary flexible hinging could be achieved by an appropriate choice of somewhat malleable material for the fixed length cross bar and L-shaped member's leg, in which case construction could be unitary. In any case, the foregoing and other possible implementations should likewise all be considered within the scope of the present invention.

Figure 4:
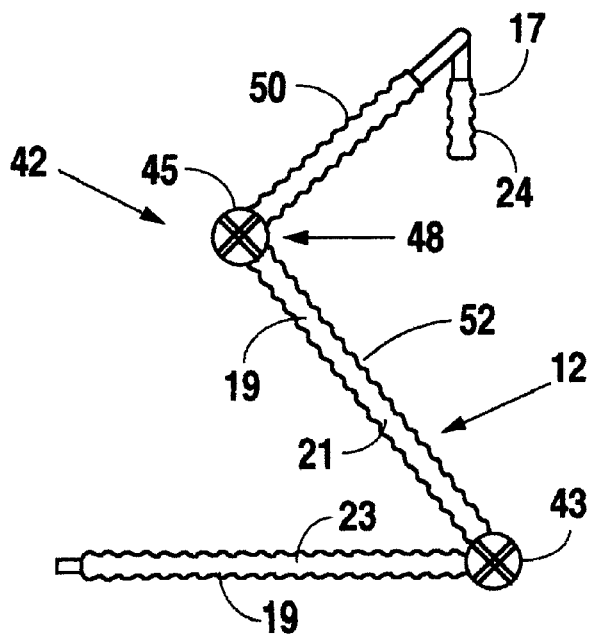
FIG. 4 shows, in side plan view, an alternate embodiment of the gun rack of the present invention.
Figure 5:
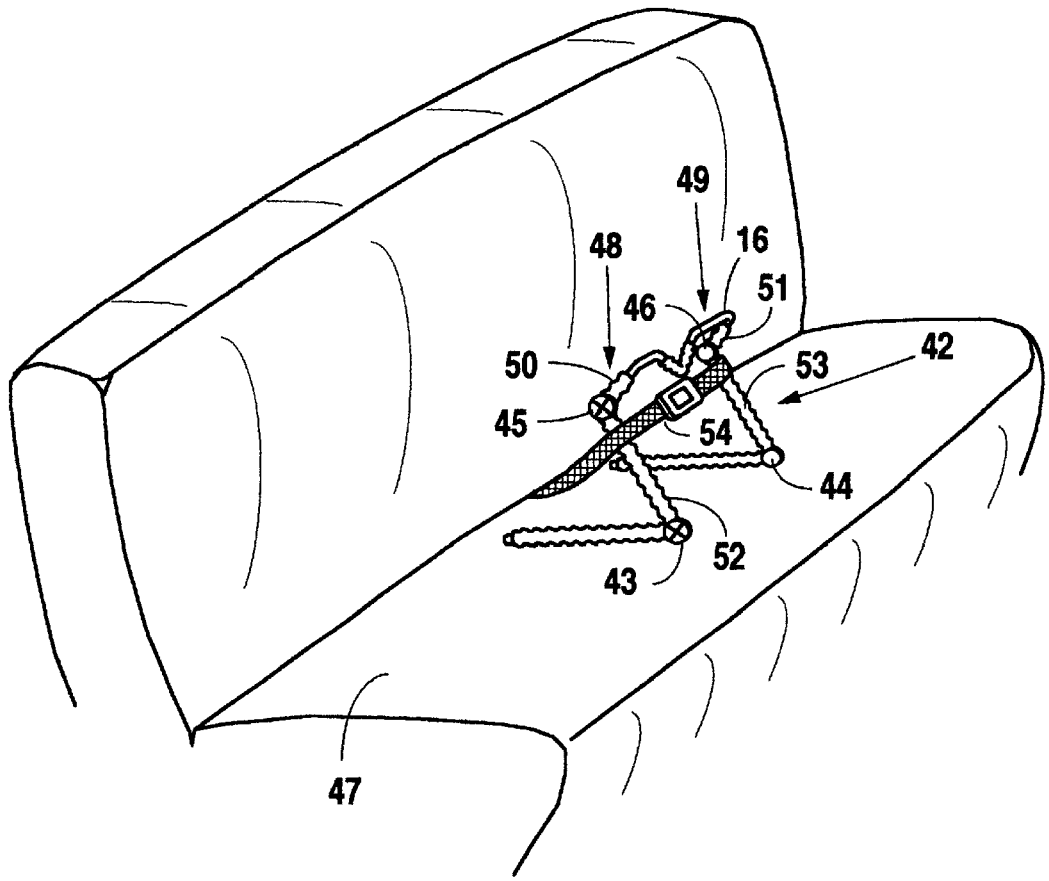
FIG. 5 shows, in perspective view, the alternate embodiment of FIG. 4.

Turning now to FIGS. 4 and 5, an alternate embodiment 42 of the present invention is detailed. As shown in the Figures, this embodiment comprises a plurality of hinges 43, 44, 45, 46 at various locations of the L-shaped members 11, 12, thereby facilitating compact storage of the gun rack 42 and, as will be better understood further herein, enabling use of the present invention in vehicles having only a bench seat 47. In particular, a first pair of hinges 43, 44 is provided one each between the leg portion 20, 21 and foot portion 22, 23 of each L-shaped member 11, 12. This hinge pair thereby allows the foot portion 22, 23 of each member 11, 12 to be folded under and substantially parallel with its corresponding leg portion 20, 21. In addition, a second pair of hinges 45, 46 is provided one each interposed in substantially the center, or knee area 48, 49, of the leg portion 20, 21 of each member 11, 12. This hinge pair thereby allows the upper leg portion 50, 51 and cross bar 16 or bars to be folded over and substantially coplanar with the lower leg portions 52, 53 of the members. Each hinge 43, 44, 45, 46 is provided with an integral locking feature, thereby allowing the gun rack 42 to be securely established in the shape of the previously described embodiments 10 or, for storage, secured in a compactly folded configuration.

As also shown in FIGS. 4 and 5, the locking hinges 43, 44, 45, 46 also allow the gun rack 42 to be positioned and secured in an intermediate configuration, with lower overall height and bent knee areas 48, 49. Referring to FIG. 5, in particular, this configuration is ideally suited for placement directly atop a vehicle's seat 47. Those of ordinary skill in the art will recognize, however, that, because of the many configurations that this embodiment may easily take, the gun rack 42 could also be configured for placement of the feet 22, 23 beneath the seat. The trough 17 or troughs are canted forward to substantially the same position as with the previously described embodiments 10 and the bent knee 48, 49 areas allow the vehicle's scat belt 54 to be tightly affixed about the gun rack 42, securing it firmly in place on the seat 47. While the described embodiment is the preferred implementation of this feature, those of ordinary skill in the art will nonetheless recognize many further alternatives. For example, anchors or the like may be specifically provided for securing of the seat belt 54. All such substantial equivalents should however be considered within the scope of the present invention.

Figure 6:
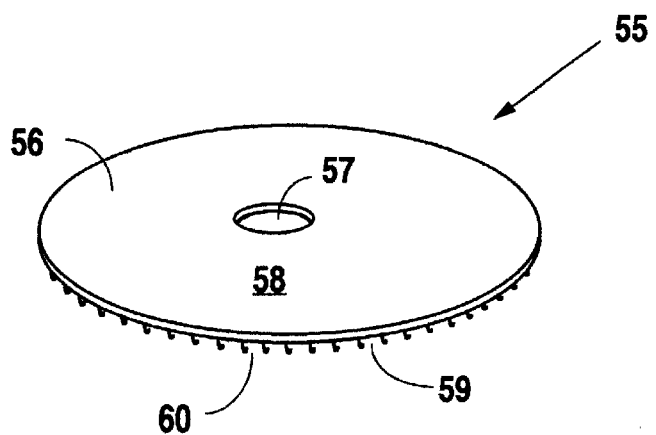
FIG. 6 shows, in perspective view, an additional aspect of the preferred and alternate embodiments of the present invention.

While the foregoing description is exemplary of the preferred embodiment of the present invention, those of ordinary skill in the relevant arts will recognize the many variations, alterations, modifications, substitutions and the like as are readily possible, especially in light of this description, the accompanying drawings and claims drawn thereto. For example, ability of the previously described gun rack 10, 42 to secure a rifle or shotgun may be greatly enhanced by the provision of an associated stabilizer 55. Such a stabilizer 55, as depicted in FIG. 6, may generally comprise a flexible base 56, comprising for example a polymeric material, and a cylindrical cup 57 affixed to, or made integral with, its top portion 58. The stabilizer 55 is placed on the vehicle's floorboard for fixing the end of the barrel of the gun supported by the gun rack 10, 42. Although the flexible nature of the base 56 serves to frictionally engage the floorboard without sliding, the preferred embodiment of the stabilizer 55 comprises a laminate of hook type fasteners 59 on the bottom portion 60. These hook type fasteners 59 will grip the carpet on the floorboard and further ensure fixed placement. In addition to securing the gun's barrel, those of ordinary skill in the art will recognize that such a stabilizer 55, or its substantial equivalent, will also protect the vehicle's carpet from wear. In any case, because the scope of the present invention is much broader than any particular embodiment, the foregoing detailed description should not be construed as a limitation of the scope of the present invention, which is limited only by the claims appended hereto.

What is claimed is:

1. A vehicle gun rack for nondestructive use in any of a variety of vehicle models, said vehicle gun rack comprising:
    a first and second substantially L-shaped vehicle engagement member, each said engagement member comprising a leg portion and a foot portion, said foot portions and a lower part of each said leg portion each being adapted to laterally engage a vehicle center console, said foot portions and said lower parts being thereby adapted to impart stability to said gun rack;
    a cross member disposed between and dependently supported by said leg portions of said first and second engagement members, said cross member being disposed between an upper part of each said leg portion such that said cross member and said engagement members cooperate to form a substantially open interior space about said lower part of said leg portions for receiving therebetween the vehicle center console; and
    said cross member comprising a trough, said trough being adapted to support the stock portion of a gun.

2. A vehicle gun rack for nondestructive use in any of a variety of vehicle models, said vehicle gun rack comprising:
    a first and second substantially L-shaped vehicle engagement member, each said engagement member comprising a leg portion and a foot portion;
    a cross member disposed between and dependently supported by said leg portions of said first and second engagement members;
    said cross member comprising a trough, said trough being adapted to support the stock portion of a gun; and
    wherein each said leg portion of said first and second engagement members comprises a depressible outer surface adapted to firmly engage a vehicle console without damage thereto.

3. The vehicle gun rack as recited in claim 2, wherein each said foot portion of said first and second engagement members comprises a depressible outer surface.

4. The vehicle gun rack as recited in claim 2, wherein said depressible outer surface comprises a foam material.

5. The vehicle gun rack as recited in claim 2, wherein:
    said trough comprises a substantially concave upper portion and a substantially convex lower portion; and
    said upper portion of said trough comprises a surface adapted to engage the stock of a gun without damage thereto.

6. The vehicle gun rack as recited in claim 5, wherein each said leg portion of said first and second engagement members is adapted to flexibly engage an opposite side portion of a vehicle center console.

7. The vehicle gun rack as recited in claim 6, wherein each said leg portion of said first and second engagement members comprises spring steel construction.

8. The vehicle gun rack as recited in claim 5, wherein said cross member has an adjustable width.

9. The vehicle gun rack as recited in claim 8, wherein adjustment of the width of said cross member effects the relative spacing of said leg portions one to the other.

10. The vehicle gun rack as recited in claim 9, wherein said cross member comprises a turnbuckle.

11. The vehicle gun rack as recited in claim 10, wherein said turnbuckle comprises a locking device, said locking device being adapted to secure the width of said cross member.

12. The vehicle gun rack as recited in claim 5, said vehicle gun rack further comprising a barrel stabilizer, said barrel stabilizer comprising:
   a flexible base member, said base member having an upper portion and a lower portion, said lower portion comprising hook-type fasteners; and
   a cup disposed on said upper portion of said flexible base member, said cup being adapted to receive the end portion of the barrel of a gun.

13. The vehicle gun rack as recited in claim 5, said vehicle gun rack further comprising a second cross member disposed between and dependently supported by said leg portions of said first and second engagement members.

14. The vehicle gun rack as recited in claim 13, wherein at least one said cross member has an adjustable width.

15. The vehicle gun rack as recited in claim 14, wherein adjustment of the width of one cross member relative the other cross member creates a lever action in said first and second engagement members.

16. The vehicle gun rack as recited in claim 5, wherein each said L-shaped engagement member is adapted to fold upon itself such that each said foot portion of said first and second engagement members is positioned substantially parallel to its corresponding leg portion.

17. The vehicle gun rack as recited in claim 16, said vehicle gun rack further comprising a first pair of hinges, one hinge of said first pair being respectively disposed between said leg portion and said foot portion of each said engagement member to allow each said engagement member to fold upon itself.

18. The vehicle gun rack as recited in claim 17, wherein at least one hinge of said first pair comprises a position-locking device.

19. The vehicle gun rack as recited in claim 17, said vehicle gun rack further comprising a second pair of hinges, said second pair being interposed one each in a knee region of said leg portion of each said engagement member, said second pair thereby defining an upper leg portion and a lower leg portion in each leg portion, each said upper leg portion being articulatable with respect to each corresponding lower leg portion.

20. The vehicle gun rack as recited in claim 19, wherein at least one hinge of each said pair comprises a position-locking device.

* * * * *